United States Patent Office 3,553,109

Patented Jan. 5, 1971

3,553,109
RESISTOR COMPOSITIONS CONTAINING PYROCHLORE-RELATED OXIDES AND NOBLE METAL

Lewis C. Hoffman, Wilmington, Del., assignor to E. I. du Pont de Nemours and Company, Wilmington, Del., a corporation of Delaware No Drawing. Continuation-in-part of application Ser. No. 748,952, July 31, 1968, which is a continuation-in-part of abandoned application Ser. No. 701,016, Jan. 26, 1968. This application Oct. 24, 1969, Ser. No. 869,351

Int. Cl. H01b *1/02*

U.S. Cl. 252—514 11 Claims

ABSTRACT OF THE DISCLOSURE

Resistor compositions, which yield, upon firing, smooth resistors having a wide range of resistances, low TCR's and good stability properties, comprising (1) an oxide of the formula $$(M_xBi_{2-x})(M'_yRu_{2-y})O_{7-z}$$

wherein M is at least one metal selected from the group consisting of yttrium, lanthanum, thallium, indium, cadmium, lead and the rare earth metals of atomic number 58–71 inclusive, M′ is at least one metal selected from the group consisting of platinum, titanium, tin, chromium, rhodium, iridium, rhenium, zirconium, antimony and germanium, (2) an inorganic binder, (3) noble metal, and (4) optionally, a binary oxide (e.g., $Co_3O_4$). The control over properties afforded by this combination of ingredients and proportions thereof enhances the significance of this invention.

CROSS-REFERENCE TO RELATED APPLICATIONS

This is a continuation-in-part of U.S. patent application S.N. 748,952, filed July 31, 1968, which is a continuation-in-part of U.S. patent application S.N. 701,016, filed Jan. 26, 1968, now abandoned.

BACKGROUND OF THE INVENTION

Precious resistor compositions containing an inorganic binder have become highly desirable for use in the production of fired electrical resistors. Such resistor compositions and resistors prepared therefrom are, for example, shown in D'Andrea U.S. Pat. 2,924,540 and Dumesnil U.S. Pat. 3,052,573.

Electrical resistors made with these and other prior art compositions possess one or more of the following undesirable properties: high temperature coefficients of resistance, rough surface characteristics, high noise character, a high percentage of drift and poor moisture resistance.

Temperature coefficient of resistance (TCR), generally expressed in parts per million per degree centigrade, is an important characteristic of resistors since changes in temperature will create relatively large changes in resistance when the TCR is high. TCR is generally measured by measuring:

(1) Resistance at room temperature
(2) Resistance at −75° C.
(3) Resistance at 125° C.

Great care is taken to achieve thermal equilibrium at each temperature. The change in resistance is expressed as a function of the room temperature resistance, divided by the temperature increment to give the coefficient.

All of the other above-mentioned properties detract from the overall usefulness of resistors in the electronic field today. Naturally, the elimination of these undesirable properties will conversely produce resistors with highly desirable properties.

Thus, there is a continuing need for resistor compositions which can be fired to produce resistors which do not possess the above-mentioned undesirable properties. In particular, smooth resistors having low TCR's and controllable resistivities are of great importance in the electronic industry today.

SUMMARY OF THE INVENTION

This invention relates to resistor compositions comprising (1) 5–90% by weight of an oxide of the formula $$(M_xBi_{2-x})(M'_yRu_{2-y})O_{7-z}$$

wherein M is at least one metal selected from the group consisting of yttrium, lanthanum, thallium, indium, cadmium, lead and the rare earth metals of atomic number 58–71 inclusive, M′ is at least one metal selected from the group consisting of platinum, titanium, tin, chromium, rhodium, iridium, rhenium, zirconium, antimony and germanium, $x$ is a number in the range 0–2, $y$ is a number in the range 0–2, and $z$ is a number in the range 0–1, being at least equal to about $x/2$ when M is a divalent metal, (2) 10–90% by weight of a finely divided inorganic binder, (3) 1–69% by weight of finely divided noble metal, and (4) 0–10% by weight of a binary oxide selected from the group consisting of $V_2O_5$, $Cr_2O_3$, $Mn_2O_3$, $Fe_3O_4$, $Co_3O_4$, NiO, CuO and mixtures thereof.

Moreover, such resistor compositions may be dispersed in a liquid vehicle, preferably inert, to provide a resistor paint or paste that can be applied to a surface of a ceramic substrate and fired to form a stable resistor.

DESCRIPTION OF THE PREFERRED EMBODIMENTS

The preferred resistor compositions of this invention comprise 22–76% by weight of $Bi_2Ru_2O_7$, 15–64% by weight of a finely divided inorganic binder, 3–30% by weight of finely divided gold, and 0.5–5% by weight of $Co_3O_4$.

The essence of this invention lies in the inclusion of a pyrochlore-related oxide and noble metal in the resistor compositions and the proportions of oxide, noble metal, inorganic binder and binary oxide in the resistor compositions. The ternary bismuth ruthenium oxides, which are disclosed and claimed in Bouchard Ser. No. 692,108, filed Dec. 20, 1967, are incorporated by reference into this specification. The oxides which come within the scope of Ser. No. 692,108 are included in the resistor compositions of this invention. In general, oxides of the formula $(M_xBi_{2-x})(M'_yRu_{2-y})O_{7-z}$, where M is at least one metal from the group of yttrium, lanthanum, thallium, indium, cadmium, lead and rare earth metals of atomic number 58–71 inclusive, M′ is at least one metal from the group of Pt, Ti, Sn, Cr, Rh, Ir, Re, Zr, Sb and Ge, $x$ is 0–2, $y$ is 0–2 and $z$ is 0–1, being at least equal to about $x/2$ when M is a divalent metal, are operable for purpose of this invention. It is pointed out that the term "an oxide" designates pyrochlore-related oxides, including multisubstituted oxides (e.g., $NdBiRu_2O_7$, $CdPbRu_2O_6$, $CdPbRe_2O_7$) as well as mixtures of said oxides (substituted or unsubstituted). Outstanding among these oxides is $Bi_2Ru_2O_7$; it is electrically conductive with a low resistivity that is substantially independent of temperature over a wide temperature range. $Bi_2Ru_2O_7$ is also stable on heating in air to at least 1000° C., and its properties are not adversely affected by mild reducing conditions. Consequently, when resistor compositions comprising $Bi_2Ru_2O_7$ and glass binder are fired under conventional conditions (e.g., 650–850° C.), the $Bi_2Ru_2O_7$ is essentially unaffected, does not dissociate and remains as an integral part of the fired resistor.

The proportions of the various components are critical and must conform with the prescribed limits. Generally, the resistor compositions must comprise from 5–90% of a pyrochlore-related oxide, 10–90% inorganic binder, 1–69% noble metal and 0–10% of a binary oxide. The weight ratios of these components to each other have a significant effect on the resistance and the temperature coefficient of resistance; but in addition, they also have an effect on the smoothness of the fired resistors, the solderability, moisture stability, noise level and drift. When less than 5% by weight of a pyrochlore-related oxide is used, the ultimate fired resistors do not have a smooth surface; in fact, cracking and bloating occur on the surface of the fired resistors. If more than 90% by weight of the oxide is used, the bonding properties of the resistor composition are significantly affected. In most instances, there is insufficient bonding of the resistor composition to the substrate when more than 90% of a pyrochlore-related oxide is present in the resistor composition.

The TCR is greatly affected by the amount of noble metal. When the amount of noble metal is decreased below 1% by weight of the resistor composition, the TCR's of the fired resistors become high and/or negative at certain resistance levels; this is a commercially undesirable situation. Additionally, at least 1% noble metal is needed to produce fired resistors which posses the following combination of useful properties: a wide range of resistances, low TCR's, moisture stability, low noise level and low drift. Consequently, it is very important to keep the amount of noble metal within the prescribed limits. Of course, the amount of inorganic binder also has an effect on the TCR's but not as significantly as does the noble metal.

The resistivity is mainly affected by the amount of noble metal and inorganic binder present in the resistor compositions. At least 10% by weight inorganic binder must be present to produce the desired resistances in the fired resistors. On the other hand, the use of more than 90% binder reduces resistances which are too high and impractical for electronic applications. Also, when more than 69% noble metal is utilized, the compositions become too conductive, the desired resistances are not obtained and the TCR's become too high.

Optionally, a binary oxide may be included in the resistor compositions of this invention. These oxides include $V_2O_5$, $Cr_2O_3$, $Mn_2O_3$, $Fe_3O_4$, $Co_3O_4$, NiO, CuO and mixtures thereof. It is highly desirable to include these binary oxides to lower the TCR while maintaining the other desirable properties. The total amount of binary oxide ranges from 0–10% by weight of the resistor composition (solids content); the preferred range is 0.5–5%. When more than 10% of the binary oxide is used, the TCR's become too negative.

In addition to the above-mentioned specific effects which each component has on the resistor composition and the fired resistor, each of the components exerts an overall effect on all of the desirable properties. For example, the pyrochlore-related oxides, being conductive oxides, also contribute to the conductivity, and conversely, to the resistivity of the resistors. The type and amount of inorganic binder affects the noise level. The binary oxide, in addition to lowering the TCR, raises the resistance. Therefore, each of the individual components and their overall proportions must be considered together as affecting the properties of the resistor compositions and fired resistors made therefrom.

Other factors which affect the properties of the fired resistor compositions include the particle size and firing temperature. Generally speaking, the finer the oxides (pyrochlore-related and/or binary), the lower the resistance; the TCR is also lowered as the oxides become finer. As to the firing temperature, higher firing temperatures within the range of 750° C.–850° C. tend to produce resistors which are less affected by humidity.

Any inorganic material which serves to bind the noble metal and oxide(s) to the substrate can be used as the inorganic component. The inorganic binder can be any of the glass frits employed in resistor compositions for this general type. Such frits are generally prepared by melting a glass batch composed of the desired metal oxides, or compounds which will produce the glass during melting, and pouring the melt into water. The coarse frit is then milled to a powder of the desired fineness. The patents to Larsen and Short, U.S. Pat. 2,822,279 and to Hoffman, U.S. Pat. 3,207,706 describe some frit compositions which can be employed either alonge or in combination with glass wetting agents such as bismuth oxide. Typical frit compositions usable as binders in the compositions of this invention include borosilicate glasses such as lead borosilicate, cadmium borosilicate and similar borosilicates. Also, mixtures of various inorganic binders may be used.

Noble metals comprise the free metallic component of the resistor compositions of this invention. These include gold, silver, platinum, palladium, osmium, rhodium, ruthenium, iridium, alloys thereof and mixtures thereof. It has been found, in comparison with other metals, that gold produces a most significant combination of desirable properties in the resistor composition and resistors therefrom. Consequently, gold is preferred for purposes of this invention.

The resistor compositions of the invention will usually, although not necessarily, be dispersed in an inert vehicle to form a paint or paste for application to various substrates. The proportion of vehicle to resistor composition may vary considerably depending upon the manner in which the paint or paste is to be applied and the kind of vehicle used. Generally, from 1–20 parts by weight of resistor composition (oxide(s), noble metal and inorganic binder) per part by weight of vehicle will be used to produce a paint or paste of the desried consistency. Preferably, 3–10 parts per part of vehicle will be used.

Any liquid, preferably inert, may be employed as the vehicle. Water or any one of various organic liquids, with or without thickening and/or stabilizing agents, and/or other common additives, may be utilized as the vehicle. Examples of organic liquids that can be used are the higher alcohols; esters of such alcohols, for example, the acetates and propionates; the terpenes such as pine oil, alpha- and beta-terpineol and the like; and solutions of resins such as the polymethacrylates of lower alcohols, or solutions of ethyl cellulose, in solvents such as pine oil and the monobutyl ether of ethylene gycol monoacetate (butyl—O—$CH_2CH_2$—$OOCH_3$). The vehicle may contain or be composed of volatile liquids to promote fast setting after application; or it may contain waxes, thermoplastic resins or the like materials which are thermofluid so that the vehicle-containing composition may be applied at an elevated temperature to a relatively cold ceramic body upon which the composition sets immediately.

The resistor compositions are conventionally made by admixing the components in their respective proportions. Additionally, one part of vehicle or every 1–20 parts of solids mentioned above may be admixed. Then the resistor composition is applied to a ceramic body and fired to form a stable resistor.

Application of the resistor composition in paint or paste form to the substrate may be effected in any desired manner. It will generally be desired, however, to effect the application in precise pattern form, which can be readily done in applying well-known screen stencil techniques or methods. The resulting print or pattern will then fired in the usual manner at a temperature from about 750° C.–850° C. in an air atmosphere employing the usual firing lehr.

The invention is illustrated by the following examples. In the examples and elsewhere in the specification, all parts, ratios and percentages of materials or components are by weight.

Various resistor compositions were prepared employing a pyrochlore-related oxide, inorganic binder, noble metal and binary oxide in finely divided form and varying proportions. The particle sizes of these components ranged from 0.1–20 microns, which are sufficiently finely divided to pass through a 325 mesh (U.S. Standard Sieve Scale) stencil screen. All were suspended in an inert vehicle consisting of 8% ethyl cellulose and 92% beta-terpineol. The binder was a glass powder consisting of 80% PbO, 10% $SiO_2$ and 10% $B_2O_3$. The weight ratio of solid resistor composition to vehicle was 4:1 to insure paints having a preferred consistency. The paints were screen printed onto a 96% dense alumina substrate, onto which platinum-gold alloy patterns had been fired to provide electrical contacts. The substrate with the screen printed compositio thereon was heated to 100° C. and to 750° C. (fired) for approximately 10-minute periods, respectively. Adherent resistor layers approximately 1 mil thick were formed. The resistor compositions prepared in this way and fired as described above, along with their properties, are described below in Tables I and II. The resistor compositions of Tables III, IV, V and VI were prepared by the same procedure but were fired at 800° C.

TABLE I

| | Example I | | | | | | |
|---|---|---|---|---|---|---|---|
| | 1 | 2 | 3 | 4 | 5 | 6 | 7 |
| $Bi_2Ru_2O_7$ | 25 | 30 | 35 | 37 | 20 | 60 | 37.5 |
| Gold | 15 | 15 | 15 | 13 | 60 | 20 | 12.5 |
| Binder | 60 | 55 | 50 | 50 | 20 | 20 | 50.0 |
| Resistivity, Ohms/square | 146,000 | 12,800 | 1,080 | 2,660 | 0.1 | 15.3 | 2,660 |
| TCR 25 to 125° C., p.p.m./° C | −150 | +114 | +152 | +305 | +2,600 | +243 | 305 |
| TCR 25 to −75° C., p.p.m./° C | −120 | +190 | +76 | +12 | +435 | −209 | +12 |
| Smoothness | (1) | (1) | (1) | (1) | (2) | (2) | (2) |

1 Excellent.
2 Good.

TABLE II

| | Example No. | | | | | | |
|---|---|---|---|---|---|---|---|
| | 8 | 9 | 10 | 11 | 12 | 13 | 14 |
| $Bi_2Ru_2O_7$ | 45 | 55 | 50 | 45 | 55 | 70 | 55 |
| Gold | 10 | 15 | 15 | 25 | 10 | 10 | 5 |
| Binder | 45 | 30 | 35 | 30 | 35 | 20 | 40 |
| Resistivity, Ohms/square | 493 | 43 | 108 | 56 | 42 | 15 | 219 |
| TCR 25 to 125° C., p.p.m./° C | +15 | 0 | +100 | +120 | +91 | −78 | +116 |
| TCR 25 to −75° C., p.p.m./° C | −7 | −165 | −100 | −65 | −91 | +260 | −132 |
| Smoothness | (1) | (2) | (1) | (2) | (2) | (2) | (2) |

1 Excellent.
2 Good.

TABLE III

| | Example No. | | | | | | |
|---|---|---|---|---|---|---|---|
| | 15 | 16 | 17 | 18 | 19 | 20 | 21 |
| $Bi_2Ru_2O_7$ | 73 | 63.5 | 56 | 43.5 | 35 | 26 | 23.5 |
| Gold | 3.0 | 3.0 | 4.0 | 5.0 | 5.0 | 5.0 | 3.0 |
| Binder | 22.5 | 32 | 39 | 50.5 | 59 | 68.5 | 73.0 |
| $Co_3O_4$ | 1.5 | 1.5 | 1.0 | 1.0 | 1.0 | 0.5 | 1.5 |
| Resistivity, Ohms/square | 20 | 100 | 600 | 4,200 | 9,500 | 78,000 | 160,000 |
| TCR 25 to 125° C., p.p.m./° C | +45 | +60 | +57 | +67 | +105 | +50 | +68 |
| TCR 25 to −75° C., p.p.m./° C | −347 | −160 | −137 | −108 | −49 | −97 | −72 |
| Smoothness | (1) | (1) | (1) | (1) | (1) | (1) | (1) |

1 Excellent.

TABLE IV

| | Example No. | | | | | | | |
|---|---|---|---|---|---|---|---|---|
| | 22 | 23 | 24 | 25 | 26 | 27 | 28 | 29 |
| $Tl_2Ir_2O_7$ | 50 | 50 | | | | | | |
| $Bi_2Ir_2O_7$ | | | 50 | 50 | | | | |
| $(NdBi)_2Ru_2O_7$ | | | | | 50 | 50 | | |
| $La_2Ru_2O_7$ | | | | | | | 50 | 50 |
| Gold | 10 | 10 | 10 | 10 | 10 | 10 | 10 | 10 |
| Glass | 40 | 39 | 40 | 36 | 40 | 31 | 40 | 34 |
| $Co_3O_4$ | | 1 | | | | | | |
| $Fe_3O_4$ | | | | 4 | | | | |
| NiO | | | | | | 9 | | |
| CuO | | | | | | | | 6 |
| Resistivity, Ohms/square | 4,000 | 3,800 | 1,400 | 1,700 | 231 | 410 | 2,000 | 2,480 |
| TCR 25 to 125° C., p.p.m./° C | +500 | +70 | +200 | +94 | +500 | +110 | +800 | +170 |
| TCR 25 to −75° C., p.p.m./° C | −390 | −110 | −150 | −110 | −490 | −120 | +600 | +210 |
| Smoothness | (1) | (1) | (1) | (1) | (1) | (1) | (1) | (1) |

1 Excellent.

TABLE V

| | Example No. | | | | | |
|---|---|---|---|---|---|---|
| | 30 | 31 | 32 | 33 | 34 | 35 |
| $Bi_2Ru_2O_7$ | 68.5 | 60 | 50 | 39.5 | 29.5 | 25 |
| Gold | 3.0 | 2.0 | 2.0 | 5.0 | 5.0 | 4.0 |
| Binder | 28 | 36 | 45.5 | 52.5 | 63.5 | 69 |
| $Co_3O_4$ | 0.5 | 2.0 | 2.5 | 3.0 | 3.0 | 2.0 |
| Resistivity, Ohms/square | 21 | 96 | 440 | 870 | 3,200 | 8,900 |
| TCR 25 to 125° C., p.p.m./° C | +19 | +21 | +50 | +70 | +176 | +181 |
| TCR 25 to −75° C., p.p.m./° C | +127 | −142 | 0 | +49 | +69 | +90 |
| Smoothness | (1) | (1) | (1) | (1) | (1) | (1) |

1 Excellent.

TABLE VI

| | Example No. | | |
|---|---|---|---|
| | 36 | 37 | 38 |
| $Bi_2Ru_2O_7$ | 40 | 50 | 70 |
| Gold | 0 | 10 | 0 |
| Platinum | 40 | 0 | 0 |
| Silver | 0 | 0 | 5 |
| Rhodium | 0 | 5 | 0 |
| Binder | 20 | 35 | *25 |
| Resistivity, ohms/square | 1.1 | 560 | 290 |
| TCR 25 to 125° C., p.p.m./° C | 177 | 272 | 172 |
| TCR 25 to −75° C., p.p.m./° C | −186 | 286 | −110 |
| Smoothness | Fair | Fair | Fair |

*The binder consisted of 24.8 parts of the previously described lead borosilicate and 0.2 parts of a cadmium borosilicate glass (78% CdO, 9% $B_2O_3$, 9% $SiO_2$ and 4% $Al_2O_3$).

It can be seen from the tabulated data that a proper balance must be maintained among the various components so as to obtain the desired resistance and temperature coefficient of resistance. Particular significance is attached to the fact that suitable resistor compositions can be tailor made to meet the needs of those skilled in the art by varying the proportions of ingredients within the prescribed limits of this invention.

By using the teachings of this invention, resistor compositions which can be printed and fired to yield resistors having various resistances, temperature coefficients of resistance, smoothness and good stability properties can be produced and tailor made through proper adjustment of the proportions of the ingredients as taught herein.

I claim:

1. A resistor composition comprising (1) 5–90% by weight of an oxide of the formula $$(M_xBi_{2-x})(M'_yRu_{2-y})O_{7-z}$$

wherein

M is at least one metal selected from the group consisting of yttrium, lanthanum, thallium, indium, cadmium, lead and the rare earth metals of atomic number 58–71 inclusive, M′ is at least one metal selected from the group consisting of platinum, titanium, tin, chromium, rhodium, iridium, rhenium, zirconium, antimony and germanium, $x$ is a number in the range 0–2, $y$ is a number in the range 0–2, and $z$ is a number in the range 0–1, being at least equal to about $x/2$ when M is a divalent metal, (2) 10–90% by weight of a finely divided inorganic binder, (3) 1–69% by weight of finely divided noble metal, and (4) 0.10% by weight of a binary oxide selected from the group consisting of $V_2O_5$, $Cr_2O_3$, $Mn_2O_3$, $Fe_3O_4$, $Co_3O_4$, NiO, CuO and mixtures thereof.

2. A resistor composition in accordance with claim 1 which is dispersed in an inert vehicle, said composition being present in an amount of from 1–20 parts by weight per part by weight of inert vehicle.

3. A resistor composition in accordance with claim 1 wherein said ternary oxide is $Bi_2Ru_2O_7$.

4. A resistor composition in accordance with claim 1 wherein said ternary oxide is $Bi_2Ir_2O_7$.

5. A resistor composition comprising (1) 16–80% by weight of a ternary oxide of the formula $$(M_xBi_{2-x})(M'_yRu_{2-y})O_{7-z}$$

wherein

M is an ion of a metal selected from the group consisting of yttrium, thallium, indium, lead and the rare earth metals of atomic number 57–71 inclusive, M′ is an ion of a metal selected from the group consisting of platinum, titanium, tin, chromium, rhodium, iridium, antimony and germanium, $x$ is a number in the range 0–2, $y$ is a number in the range 0–2, and $z$ is a number in the range 0–1, being at least equal to about $x/2$ when M is divalent lead or cadmium, (2) 15–79% by weight of a finely divided inorganic binder, (3) 1–69% by weight of finely divided gold, and (4) 0–10% by weight of a binary oxide selected from the group consisting of $V_2O_5$, $Cr_2O_3$, $Mn_2O_3$, $Fe_3O_4$, $Co_3O_4$, NiO, CuO and the mixtures thereof.

6. A resistor composition in accordance with claim 5 which is dispersed in an inert vehicle, said composition being present in an amount of from 1–20 parts by weight per part by weight of inert vehicle.

7. An electrical resistance element comprising an electrically nonconductive substrate having fired thereon the resistor composition of claim 3.

8. A resistor composition comprising 22–76% by weight of $Bi_2Ru_2O_7$, 15–64% by weight of finely divided inorganic binder, 3–30% by weight of finely divided gold, and 0.5–5% by weight of $Co_3O_4$.

9. An electrical resistance element comprising an electrically nonconductive substrate having fired thereon the resistor composition of claim 1.

10. An electrical resistance element comprising an electrically nonconductive substrate having fired thereon the resistor composition of claim 5.

11. An electrical resistance element comprising an electrically nonconductive substrate having fired thereon the resistor composition of claim 8.

References Cited

UNITED STATES PATENTS

| | | | |
|---|---|---|---|
| 2,976,505 | 3/1961 | Ichikawa | 252—520 |
| 2,981,699 | 4/1961 | Ichikawa | 252—520 |
| 2,985,700 | 5/1961 | Johnston | 252—520 |

DOUGLAS J. DRUMMOND, Primary Examiner

U.S. Cl. X.R.

117—227; 252—521

PO-1050
(5/69)

UNITED STATES PATENT OFFICE
CERTIFICATE OF CORRECTION

Patent No. 3,553,109 Dated January 5, 1971

Inventor(s) Lewis C. Hoffman

It is certified that error appears in the above-identified patent and that said Letters Patent are hereby corrected as shown below:

In column 1, line 44, after "Precious", insert -- metal --.

In column 2, line 47, after "1967", insert -- (refiled as S.N. 880,327, November 26, 1969) and the ternary oxides $Tl_2Ru_2O_7$ and $Tl_2Ir_2O_7$ which are disclosed and claimed in Sleight S.N. 741,220, filed June 28, 1968, --.

In column 2, line 49, after "692,108", insert -- S.N. 880,3 and S.N. 741,220 --.

In column 2, line 58, change "purpose" to -- purposes --.

In column 3, line 26, change "posses" to -- possess --.

In column 4, line 12, change "alonge" to -- alone --.

In column 4, line 68, after "then", insert -- be --.

In column 6, line 4, change "compositio" to -- composition

In line 2 of Table I, change "Example I" to -- Example No.

In column 7, line 49, change "0.10%" to -- 0-10% --.

Signed and sealed this 23rd day of November 1971.

(SEAL)
Attest:

EDWARD M.FLETCHER,JR.
Attesting Officer

ROBERT GOTTSCHALK
Acting Commissioner of Patent: